3,473,199
ROPE CLAMP WITH A CONE END
Paul Gerhard Rohland, Post Box 16004,
Goteborg 16, Sweden
Filed Aug. 27, 1965, Ser. No. 483,282
Int. Cl. F16g *11/00;* F16b *7/00;* F16d *1/00*
U.S. Cl. 24—123                                    8 Claims

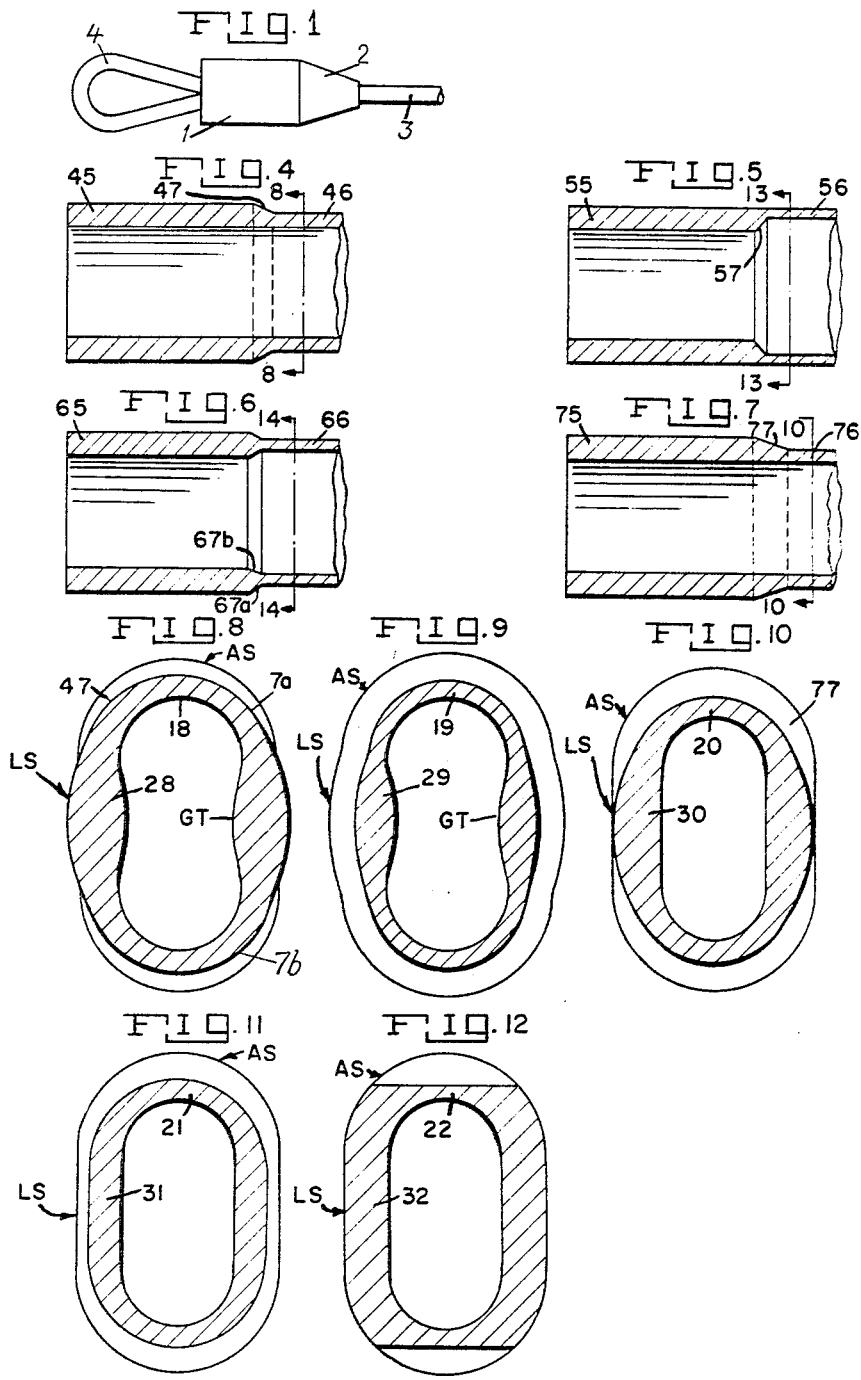

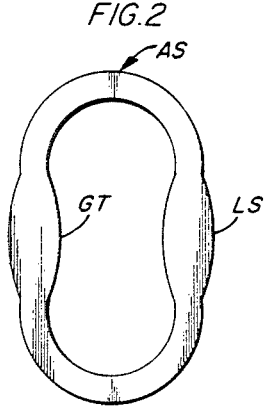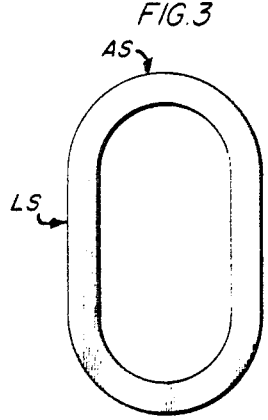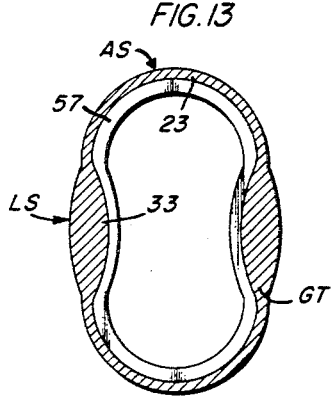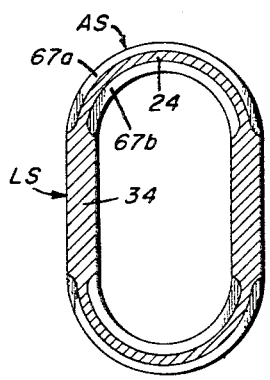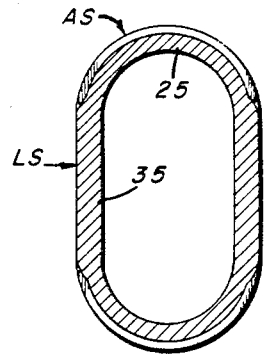

ABSTRACT OF THE DISCLOSURE

A rope clamp of metal, plastic and the like deformable material that is to be pressed in a non-detachable fashion onto a rope for providing a connection or loop that comprises a straight tubular sleeve that is of at least a substantially oval shape cross-section throughout its length, including arcuate transverse sides and longer connecting sides intermediate the opposite ends of the arcuate transverse sides and in which the sleeve comprises two portions, a first portion extending inwardly from one end of the sleeve in which for the entire length of said first portion, each arcuate transverse side has the same wall thickness and each longer connecting side has the same wall thickness and a second portion extending beyond the first portion with the wall thickness of the arcuate transverse sides of the second portion being thinner than the wall thickness of the major extent of the longer connecting sides of the second portion and substantially thinner than the wall thickness of the arcuate transverse sides of the first portion so that the second portion can be deformed to provide a rope clamping cone without overcompressing a load-carrying metal rope part extending through the clamp.

---

The present invention relates to a tubular rope clamp of iron, metal, plastic or other deformable material, equipped with a preformed end portion, intended for deformation into a cone and which rope clamp is capable of being pressed, in a non-detachable manner, onto two ropes of any kind to make connections or loops.

The use of a ferrule or clamp provided with an oval cross section that is uniform over the whole length of the clamp or ferrule, for joining two ropes and for holding end loops formed in such ropes is already known. Such ferrules or clamps are to be non-detachably pressed onto the ropes under a very high pressure whereby a circular cross section of the oval clamp is finally obtained. During this transforming and pressing process, the material of the ferrule penetrates into the hollow spaces between the rope strands or, when using steel wire ropes, between the single threads, thus enclosing the rope completely and securely without any hollow space. This invention is based on the idea of pressing such a clamp with a preformed end portion into a cone at least at one end in one stage avoiding strong compression and deformation of the outgoing, single load-carrying rope, having as a main object to lead this rope to the center and prevent catching. Earlier proposals with these objects in view, present certain difficulties in connection with the mounting of such clamps and also cause manufacturing problems which can only be overcome by several and expensive procedures.

The concept of pressing a cylindrical rope clamp by conical press dies into a conical shape, at least at one end, is also known, but this method causes a risky over-pressure to the bearing rope with serious consequences; therefore this method already is officially forbidden in some countries. Apart therefrom, this method requires, as expressly declared by the supplier, two pressing stages which entail considerable time and money.

The providing of a rope clamp with an oval cross section at the end, which ultimately forms an end-cone, with a uniform peripheral taper, unavoidably results in cracking of the conical part, if this is formed in one stage together with the clamp. It has been established by many experiments that the same conditions exist, if the end part, which finally forms a cone, possesses an equally reduced peripheral wall thickness.

Therefore this invention has for an object to overcome the above named disadvantages and is directed to the concept that the oval, tubular rope clamp sleeve is provided with an end portion destined to be deformed into a cone, and said end portion having a reduced wall thickness in comparison with the thickness of the other portion of the rope clamp sleeve, at least at the half-round transverse sides of the oval that are to be exposed to direct pressure.

Further and more specific objects will be apparent from the following description taken in connection with the accompanying drawings in which:

FIGURE 1 is a side view of a cable clamp in use on a cable,

FIGURES 2 and 3 are end elevational views of two differently shaped clamp-forming tubular bodies as viewed from the left in FIGURE 1, FIGURES 4 to 7 are longitudinal sectional views of different embodiments of a clamp according to the invention, FIGURE 8 is a vertical sectional view through a clamp-forming body of the general configuration of FIGURE 2 as taken along line 8—8 of FIGURE 4, FIGURE 9 is a view similar to FIGURE 8 but illustrating a further embodiment of the invention, FIGURE 10 is a vertical sectional view taken through a clamp-forming body of the general configuration of FIGURE 3 as taken along line 10—10 of FIGURE 7, FIGURE 11 is a view similar to FIGURE 10 but illustrating an embodiment of the invention, FIGURE 12 is a view similar to FIGURES 10 and 11 and illustrating still another embodiment of the invention, FIGURE 13 is a vertical sectional view through a clamp-forming body of the general configuration of FIGURE 2 as taken along line 13—13 of FIGURE 5, FIGURE 14 is a vertical sectional view through a clamp-forming body of the general configuration of FIGURE 3 as taken along line 14—14 of FIGURE 6, and FIGURE 15 is a view similar to FIGURE 14 but illustrating still another embodiment of the invention.

The general arrangement of a rope clamp is shown in FIGURE 1 and consists of a tubular sleeve of metal having, as viewed from the left of this figure, the general shape of either of FIGURES 2 and 3. Thus the left hand end or first portion 1 of the sleeve can be either an oval having arcuate inner and outer longer side walls so that it is in effect bulged at the middle or at its minor axis FIGURE 2, or what could be termed a straight-sided oval or flattened ellipse as in FIGURE 3. Extending from the first portion of the sleeve is a second portion 2 that is an end cone that surrounds the load bearing portion 3 of a rope having a loop 4 protruding from the end of the first portion 1 of the rope clamp.

The characteristic of the rope clamp of the present invention consists in a straight tubular sleeve consisting of a first or, as shown in FIGURES 4 to 7, left hand portion 45, 55, 65 and 75, respectively, and a second or thinner cone-forming portion 46, 56, 66 and 76, respectively, and being the right hand portion of FIGURES 4 to 7 and of a length sufficient to form a cone such as shown at 2 in FIGURE 1. This second and thinner portion which maintains or continues the longitudinal direction of the first portion, can be obtained by a press operation or by other mechanical procedures such as machining.

The reduction in wall thickness of the second or cone-forming portion of the clamp may be obtained in different ways as shown in FIGURES 4 to 15. The thicker material of the first or left hand portion passes over into the thinner, second or right hand portion by a soft, preferably rounded form, thus having an equal thinner thickness in approximately all its length, as shown. However, the arrangement is not to be limited thereto.

FIGURES 4, 5 and 6 illustrate that the transition from the thicker first portions to the thinner second portions may occur rather abruptly as indicated by the tapered portions 47, 57 and 67a and 67b in these respective figures, allowing a long uniform length of these second portions. FIGURE 7 illustrates a form in which the transition is more gradual as shown by the longer tapered portion 77.

In addition FIGURES 4 and 7 and 5 and 6 illustrate other modifications. In FIGURES 4 and 7 the inner periphery of the second portions 46 and 76 coincides with or is a continuation of the inner periphery of the first portions 45 and 75 and in each instance the sleeve is externally reduced. In FIGURE 5 the second portion 56 is internally reduced at 57 so that the inner periphery thereof is outwardly of the inner periphery of the first portion 55. In FIGURE 6 the thinner second portion 66 is both externally and internally reduced at 67a and 67b so that the outer and inner peripheries thereof are respectively inwardly and outwardly of the outer and inner peripheries of the first portion 65.

FIGURES 8 to 15 illustrate several modifications of the second portion as seen in vertical section and in each of which figures it is clear that the straight tubular body of essentially oval cross section throughout its length includes arcuate transverse sides indicated generally at AS in all forms and longer connecting sides similarly denoted LS interconnecting the opposite ends of the respective transverse sides. The sides of the first portions of each form, each have predetermined wall thickness that remains the same throughout the entire length, in other words the arcuate sides AS are the same wall thickness throughout the axial extent of the first portions up to the tapered or other transition portions and the longer sides LS are of the same wall thickness for the same axial extent. These figures illustrate modifications of the arcuate transverse or what could be termed half-round transverse sides AS of the respective second portions 46, 56, 66 and 76. From these figures it will be clear that the respective arcuate or half-round transverse sides 18, 19, 20, 21, 22, 23, 24 and 25 have respective wall thickness substantially thinner than the wall thicknesses of the arcuate sides AS of the associated first portions, they are thinner than at least the major extent of the associated longer connecting sides 28, 29, 30, 31, 32, 33, 34 and 35 interconnecting their ends and they are also thinner than the wall thickness of the longer connecting sides LS of the associated first portions.

In FIGURES 8, 9 and 13 the general cross-sectional shape is similar to FIGURE 2 in that the interconnecting sides LS of the tubular sleeves are thickened intermediate their ends with the greatest thickness GT lying at the minor axis of the generally oval body. This is also shown at 8a and 8b in FIGURE 8. In FIGURE 8 the arcuate transverse sides 18 are externally reduced so that their opposite ends merge into the same wall thickness, i.e., outer periphery, as the longer connecting sides 28 as shown by lines 7a, 7b. In FIGURE 9, the entire periphery of the second portion is externally reduced, the bulges are present intermediate the ends of the longer connecting sides 29 but the arcuate transverse sides 19 are thinner than the connecting sides 29. In FIGURE 13 the second portion is internally reduced, the bulges are still present in the connecting sides but the arcuate transverse sides 23 are thinner than the connecting sides 33.

In FIGURES 10 to 12 and 14 and 15, the general cross-sectional shape is similar to FIGURE 3 in that the tubular body is a flattened ellipse or an oval with opposite parallel longer connecting sides LS. In FIGURE 10, the arcuate transverse sides 20 are externally reduced so that they merge into the same wall thickness as that of the sides LS of the associated first portions at the central portion of connecting sides 30. However this transition in wall thickness is such that the major extent of the wall thickness of connecting sides 30 is greater than the wall thickness of arcuate transverse sides 20. In FIGURE 11 the entire periphery is externally reduced but the connecting sides 31 are thicker than arcuate transverse sides 21.

The form shown in FIGURE 14 embodies both internal and external reduction so that the material of the arcuate transverse sides 24 has its outer and inner peripheries respectively inwardly and outwardly of the outer and inner peripheries of the arcuate sides AS of the associated first portion.

FIGURE 15 is a slightly modified version of the FIGURE 10 arrangement in which the connecting sides 35 while thicker than the transverse sides 25 are in effect elongated.

Lastly, FIGURE 12 illustrates a simple form of a second portion in which the outer surfaces of the internally arcuate transverse sides 22 are flattened by only cutting off the top and bottom surfaces of the oval. In any event, these sides 22 are thinner than connecting sides 32 and the arcuate transverse sides AS of the associated first portion. In this form the wall thickness of sides 22 decreases from the ends toward the middle. Whereas in the arrangements of FIGURES 8, 10 and 11, the wall thickness at the ends of the arcuate sides 18, 20 and 21 gradually increases as these arcuate sides merge into the connecting sides 28, 30 and 31, respectively.

Likewise, it is to be pointed out that the lower limit for the wall thickness of the transverse sides of the second portions is approximately a quarter of the wall thickness of the first portion, i.e., the sleeve.

In a basic form of the rope clamp, as shown and described, with a preferably straight protruding thinner end portion which has no clamping effect onto the rope, the formation of an end cone is achieved by relatively low pressure and by an easier flowing of the material, to the great advantage of the outgoing single load-carrying rope, and without any cracks. Such advantages are effected in only one pressing stage together with the pressing of the rope clamp onto the ropes so that the working time and consequently the costs are reduced essentially.

I claim:

1. In a rope clamp of metal, plastic and the like deformable material, a straight tubular sleeve of at least a substantially oval cross section throughout its length including arcuate transverse sides and longer connecting sides intermediate the opposite ends of the respective transverse sides, and comprising a first portion extending inwardly from one end of said sleeve of predetermined wall thickness, each arcuate transverse side of the entire length of said first portion having the same wall thickness, each longer connecting side of the entire length of said first portion having the same wall thickness, and a second portion extending beyond said first portion, the wall thickness of the arcuate transverse sides of said second portion being thinner than the wall thickness of the major extent of the longer connecting sides of the second portion and substantially thinner than the wall thickness of the arcuate transverse sides of the first portion whereby said second portion can be deformed to provide a rope clamping cone without overcompressing and deforming a load-carrying rope part extending through the clamp.

2. The rope clamp as claimed in claim 1 in which the lower limit for the wall thickness of the arcuate transverse sides of the second portion is approximately one quarter of the wall thickness of the first portion.

3. The rope clamp as claimed in claim 1 in which the wall thickness of at least a portion of the extent of the longer connecting sides of the second portion is approximately the same as the wall thickness of the first portion.

4. The rope clamp as claimed in claim 1 in which the arcuate transverse sides of the second portion are of uniform wall thickness.

5. The rope clamp as claimed in claim 1 in which the wall thickness of the half-round transverse sides of the second portion decreases over at least a part of the length of said second portion.

6. The rope clamp as claimed in claim 1 in which the inner periphery of the second portion coincides with the inner periphery of the first portion.

7. The rope clamp as claimed in claim 1 in which the inner periphery of the second portion is spaced outwardly of the inner periphery of the first portion.

8. The rope clamp as claimed in claim 1 in which the outer and inner peripheries of the second portion are spaced inwardly and outwardly of the outer and inner peripheries of the first portion.

References Cited

UNITED STATES PATENTS

| 2,936,499 | 5/1960 | Rohland | 24—130 |
| 3,008,208 | 11/1961 | Stephan | 24—123 |
| 3,184,817 | 5/1965 | Chesnais. | |
| 3,242,545 | 3/1966 | Sahm. | |

FOREIGN PATENTS 825,641   12/1959   Great Britain.

BERNARD A. GELAK, Primary Examiner

U.S. Cl. X.R.

287—78, 109